United States Patent [19]

Gardian et al.

[11] Patent Number: 4,483,647

[45] Date of Patent: Nov. 20, 1984

[54] CENTERED PIPE MACHINING ARRANGEMENT

[75] Inventors: Johannes Gardian, Paderborn-Elsen; Wilhelm Beine, Borchen, both of Fed. Rep. of Germany

[73] Assignee: Benteler-Werke AG, Paderborn, Fed. Rep. of Germany

[21] Appl. No.: 387,516

[22] Filed: Jun. 11, 1982

[30] Foreign Application Priority Data

Oct. 2, 1981 [DE] Fed. Rep. of Germany ....... 3139262

[51] Int. Cl.³ .................. B23B 49/00; B23B 3/24; B23B 5/16
[52] U.S. Cl. ..................... 408/82; 82/2 E; 82/4 C; 82/45
[58] Field of Search ............. 82/4 C, 2 E, 45; 144/205; 408/88, 130, 131, 79, 80, 81, 82, 714; 10/87, 128, 107 F, 107 M, 107 PH; 279/16

[56] References Cited

U.S. PATENT DOCUMENTS

| | | | |
|---|---|---|---|
| 1,813,419 | 7/1931 | Parker | 82/2 E |
| 3,605,530 | 9/1971 | Doty | 82/4 C |
| 3,778,071 | 12/1973 | Buck | 10/107 F X |
| 3,944,379 | 3/1976 | Elrod | 408/79 |
| 4,104,937 | 8/1978 | Breaux | 82/4 C X |
| 4,147,462 | 4/1979 | Appleby et al. | 408/80 |
| 4,364,290 | 12/1982 | Astle | 82/4 C X |

FOREIGN PATENT DOCUMENTS 2549671 5/1977 Fed. Rep. of Germany .

OTHER PUBLICATIONS

Translation of German 2549671.

Primary Examiner—Francis S. Husar
Assistant Examiner—Steven B. Katz
Attorney, Agent, or Firm—Michael J. Striker

[57] ABSTRACT

An arrangement for performing machining operations at the end faces of pipes includes a tool holder which is equipped with respective tools and is mounted at least for rotation on a carrier. The carrier is mounted on the machine frame for movement normal to the axis of the pipe which is clamped in a clamping device mounted on the machine frame, such that the axis of the pipe extends parallel to the axis of the tool holder. The tool holder has a central passage in which there is guided a spindle having a tapering end portion close to the pipe. A cylinder-and-piston unit pushes the spindle out of the passage and into the interior of the pipe so that the tapering end portion of the spindle becomes coaxially nested in the open end of the pipe, its axis and thus the axis of the tool holder then coinciding with the axis of the inner surface of the pipe. The carrier is then arrested in this working position by a pair of clamping devices, and the spindle is retracted into the passage. The carrier for the tool holder is guided for vertical displacement by two guiding walls rigid therewith which are confined between and guided by two confining walls rigid with the machine frame. The carrier is supported on springs. The spindle rotates with the tool holder in its retracted position.

9 Claims, 3 Drawing Figures

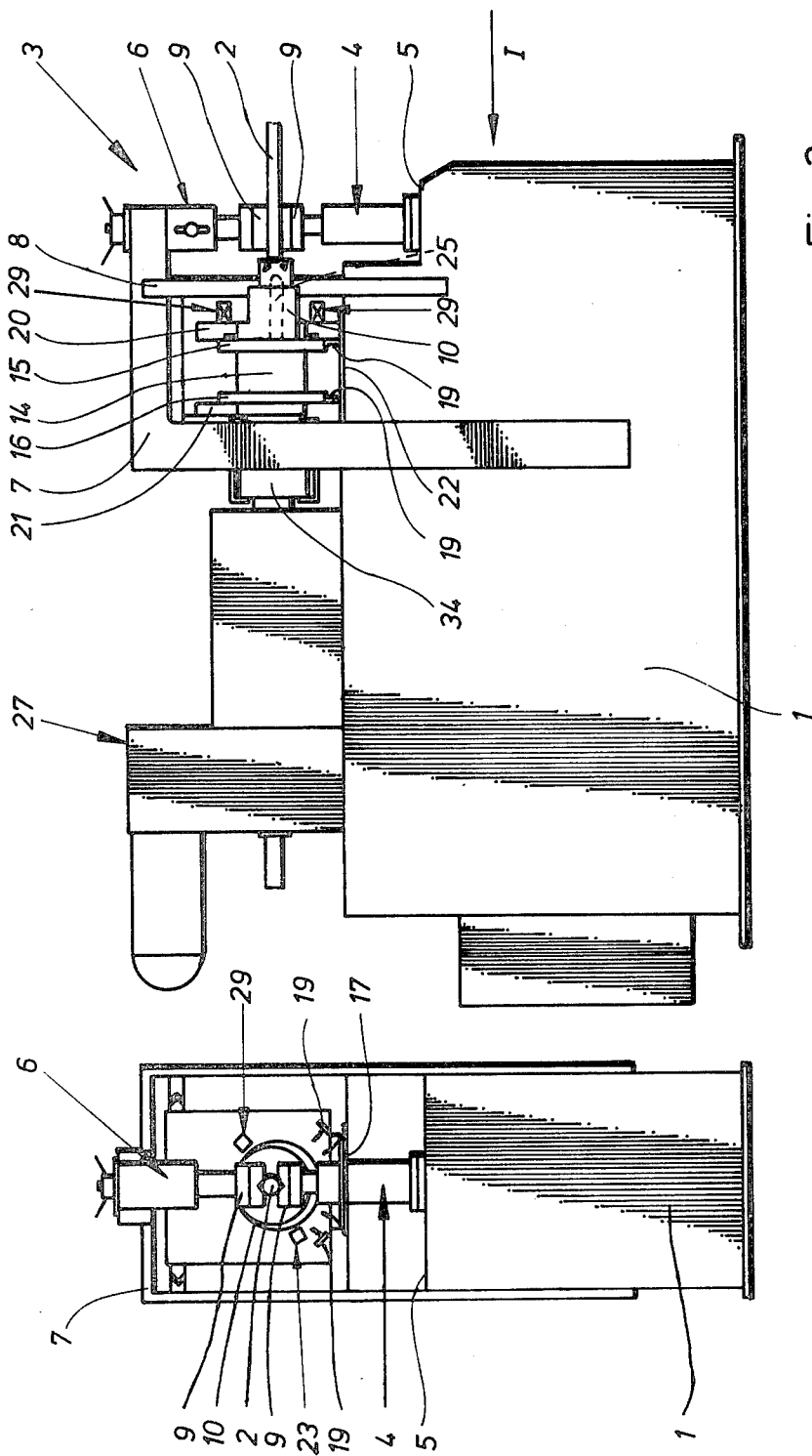

CENTERED PIPE MACHINING ARRANGEMENT

BACKGROUND OF THE INVENTION

The present invention relates to arrangements for performing machining operations on tubular objects in general, and more particularly to an arrangement for performing facing and/or chamfering operations at the end face of a pipe.

There are already known arrangements of the above type in which a clampingly holding unit holds the respective pipe in position relative to a support during the chamfering and/or facing operation performed at the end face of the pipe. The support or machine frame of this arrangement also carries a tool holder for movement in the axial direction of the pipe as well as, within a limited range, in the vertical direction. The tool holder is also mounted on the machine frame for rotation about an axis and carries the respective facing or chamfering tools. The tool holder of this conventional arrangement has an internal passage which partially accommodates a push rod or connecting rod having a free end which is connected to a mandrel which is received in the internal passage of the tool holder for movement in the axial direction and centrally into the end of the pipe. The other end of the connecting rod is connected to a cylinder-and-piston unit which is mounted on the machine frame.

An arrangement of the above type is disclosed in the published German patent application DE-OS No. 25 49 671. In this arrangement, the mandrel which is introducible into the respective pipe end is constructed as a calibrating mandrel. This calibrating mandrel has a tapering surface at that end thereof which is closer to the pipe, and is pressed by the cylinder-and-piston unit into the open end of the pipe with the express aim to eliminate any deviations from circularity which the respective pipe end may possess. In order to be able to press this calibrating mandrel into the open end of the respective pipe, it is displaceable in the vertical direction with respect to the axis of the cylinder-and-piston unit and is supported on the machine frame by means of springs. However, this calibrating mandrel is laterally guided in a positive manner. In this manner, the calibrating mandrel can become aligned with the pipe in the vertical direction, but not in the horizontal direction. The result of this is that an exact alignment of the pipe axis with the axis of the connecting rod that guides the tool carrier is impossible. More particularly, it must be taken into consideration in this connection that the pipe axis related to the outer diameter of the pipe does not necessarily coincide with the pipe axis related to the inner diameter of the pipe. When, under these circumstances, the tool carrier which is axially movably guided on the connecting rod is moved toward the end face of the respective pipe end portion, it is impossible to produce by machining either the finished end face which would extend exactly normal to the axis of the pipe as related to the inner diameter of the pipe, or chamfered surfaces which would lie within the permissible tolerance range. It is especially impossible to guarantee that the end faces and the chamfered surfaces are so configurated that, during the welding of two pipes to one another, there exists an uninterrupted and especially step-less transition between the inner surfaces of such joined pipes. Yet, in many types of practical applications, there is required an unobjectionable coincidence of the pipe axes of the consecutive pipes as related to the inner diameters of such pipes with the abutting surfaces of these pipes extending normal to such axes. This is a requirement in some applications whether the pipes are to be joined by welding or by a threaded connection.

In order to satisfy such requirements, it was previously proposed to so center the axis of rotation of the tool holder on the axis of the pipe as related to the inner pipe diameter that the inner surface of the pipe is sensed by means of sensors in the form of contacting rollers or copying rollers. An important disadvantage of this approach is that it is not suited for use with pipes having an inner diameter smaller than approximately 40 millimeters. Another disadvantage is that one of the copying rollers may, for instance, roll over fitting chips or similar irregularities, so that it necessarily yields away from the actual internal pipe surface and, as a result of this, the required tolerances cannot be achieved any longer. In addition, it is disadvantageous in this context that a copying head of this kind must be frequently maintained or repaired, in that it consists of a multitude of complicated parts which, additionally, are very wear prone, because of their constant relative movements.

Thus, it is impossible to achieve, with the conventional facing and/or chamfering arrangements, the exactly planar configuration of the end faces of pipes extending in a plane precisely normal to the axis of the respective pipes as related to the inner diameter of the respective pipe, as it is required for the welding of the end portions of consecutive pipes to one another or for the provision of unobjectionable threads on the pipe end portions, and/or the chamfered surfaces within the required range of tolerances.

SUMMARY OF THE INVENTION

Accordingly, it is a general object of the present invention to avoid the disadvantages of the prior art.

More particularly, it is an object of the invention to so construct the arrangement for machining pipes and similar tubular objects at their end faces, as not to possess the disadvantages of the conventional arrangements of this type.

Still another object of the present invention is to so construct the arrangement of the type here under consideration as to be capable of machining pipe end faces in exactly normal orientation relative to the pipe axis as related to the inner pipe diameter, and of machining chamfered surfaces within the permissible tolerance range.

It is yet another object of the invention to so construct the arrangement of the above type as to be usable with tubular objects of different diameters.

A concomitant object of the present invention is to so design the machining arrangement of the present invention and especially the centering part thereof as to be simple in construction, inexpensive to manufacture, easy to use, and reliable in operation nevertheless.

In pursuance of these objects and others which will become apparent hereafter, one feature of the present invention resides in an arrangement for performing machining, especially facing and chamfering, operations at the end faces of tubular objects, particularly pipes, of different diameters, this arrangement comprising a support; means for clampingly holding the respective tubular object on the support; a tool holder assembly including a carrier and a tool holder mounted on the carrier for at least rotational movement about an axis and having a central passage centered on this axis; at least one tool mounted on the tool holder for movement therewith; means for mounting the carrier on the support for relative displacement with the tool holder axis parallel to the object axis along a plane substantially normal to these axes; means for centering the tool holder relative to the object, including a spindle axially guided in the passage and having a tapering end portion extending toward the object, and means for moving the spindle in the passage between an extended position in which the tapering end portion extends into and engages the object, this engagement resulting in displacement of the assembly into a position of axial coincidence of the tool holder with the object, and a retracted position within the passage; means for arresting the carrier in the position of axial coincidence prior to movement of the spindle toward its retracted position; and means for effecting the movement of the tool holder.

An important aspect of the present invention as described so far is the fact that now the axis of rotation of the tool holder can be displaced due to the cooperation of the spindle with the tubular object along a plane which extends normal to the axis of the pipe to be machined as related, for instance, to the inner diameter of the pipe. In this manner, the rotation axis of the tool holder can be brought into a position of exact coincidence with the axis of the pipe or similar tubular object. At first, the spindle is moved by the moving means, such as a cylinder-and-piston unit, towards its extended position, that is, into the tubular object. Since the tubular object is held against axial and radial movement by being clamped in the holding means or device, the penetration of the spindle, that is, of its tapering end portion, into the pipe will result in a centering of the spindle and thus of the carrier with the tool holder with respect to the axis of the inner diameter of the tubular object. Any burrs present at the inner surface of the tubular object as a result of preceding sawing or similar operations are easily pushed away by the advancing spindle. Hence, the spindle is unobjectionably and precisely centered on the axis of the internal surface of the tubular object or pipe. Any eccentricities which may exist between the inner and outer cross section of the tubular object do not exert any negative influence any longer. As a result of the positive guidance of the tool holder in the plane which is normal to the axis of the tubular object or pipe, the tool holder is able to center itself on the centered spindle. As a result of the following arrest of the tool holder assembly in the centered position of axial coincidence of the tool holder with the axis of the tubular object, this axially coincident position is maintained even after the withdrawal of the spindle into its retracted position within the passage of the tool holder, so that the machining operation can be performed at the now easily accessible end face of the tubular object.

An advantageous construction according to the present invention is obtained when there is provided spring means that at least mediately supports the carrier of the tool holder assembly on the support, and when the mounting means includes a pair of confining walls extending normal to the object axis at an axial distance from one another, and a pair of guiding walls rigid with the carrier and extending at least around the tool holder normal to the axis of the latter, each of the guiding walls being juxtaposed with one of the confining walls at the side of the latter which faces toward the other confining wall. Then, the arresting means advantageously includes means for clamping at least one of the guiding walls with the respectively juxtaposed confining wall.

Hence, the guidance is constituted by the confining walls which extend perpendicularly to the advancement axis that coincides with the axis of rotation of the tool holder. Thus, the confining walls permit the displacement of the carrier of the tool holder assembly in all radial directions. The compression springs forming the spring means support the carrier of the tool holder assembly during the centering phase of operation, that is, while the arresting means is ineffective. Thus, the position corrections which are possibly effected by the spindle can be accomplished to a substantial degree without encountering any significant resistance. The confining walls which constitute at least mediately components of the machine frame or support safely accept and transmit the forces and stresses occurring during the machining operations once the tool holder carrier is clamped thereto, without change in the exact centering of the tools on the axis of the tubular object.

In accordance with a further facet of the present invention, it is advantageous when the clamping means includes at least two clamping cylinder-and-piston units extending substantially parallel to the object axis at respective locations which are diametrically spaced from one another with respect to the object axis. In this construction, the cylinders of the clamping cylinder-and-piston units can be mounted on the confining walls, while the piston rods thereof may extend through appropriately situated openings in the confining and guiding walls. Then, the piston rods have at their respective free ends respective clamping heads which, upon appropriate admission of a pressurized medium into the clamping cylinder-and-piston units, pull the respective guiding wall toward the associated confining wall. In this manner, the carrier of the tool holder assembly is securely arrested in the working or machining position which is determined by the operation of the spindle.

A further advantageous feature of the present invention resides in the fact that the arresting means further includes friction linings situated between the respective confining and guiding walls Such braking linings prevent an undesired displacement of the tool holder out of its centered position during the machining engagement of the tools with the end portion of the tubular object or pipe.

Advantageously, the centering means of the present invention includes means for guiding the spindle in the passage of the tool holder for only axial movement but not for rotation about the tool holder axis relative to the tool holder; then, the cylinder-and-piston unit which constitutes the actuating part of the moving means for the spindle is pivotally mounted on the support and its piston rod, which extends out of the cylinder-and piston unit, is connected to a connecting rod that is connected to the spindle for relative angular movement with respect thereto about the axis of the piston rod. In this manner, relative movements between the spindle and the tool holder and thus the wear at this region are reduced to a minimum. After it has performed its centering function, the spindle is retracted into the passage of the tool holder and then forms a jointly rotating component of the tool holder. The mounting at the side of the cylinder-and-piston unit for relative rotation or angular movement reduces the total mass subject to rotation and permits the mounting of the cylinder-and-piston unit on the machine frame or support in a manner which is to a large extent stationary.

It is also advantageous when the effecting means includes a drive, and a coupling interposed between the drive and the tool holder and permitting limited spatial movement of the tool holder relative to the drive. The coupling is advantageously disposed at the end of the tool holder which is closer to the actuating cylinder-and-piston unit, and it surrounds the connecting rod for relative rotation between the same. The spatial movability of the coupling enhances the unimpeded centering of the tool holder relative to the axis of the tubular element or object, such as a pipe.

Finally, an additional important concept of the present invention resides in the fact that the effecting means and the moving means are mounted on the carrier for displacement therewith and with the tool holder along the aforementioned plane. Even this feature enhances the compactness of the arrangement, without, however, deleteriously influencing the desired centering of the tool holder on the axis of the tubular object as related to the inner diameter surface of the respective tubular object.

The novel features which are considered as characteristic of the invention are set forth in particular in the appended claims. The improved arrangement for performing machining operations at the end faces of pipes itself, both as to its construction and its mode of operation, together with additional features and advantages thereof, will, however, be best understood upon perusal of the following detailed description of certain specific embodiments with reference to the accompanying drawing.

BRIEF DESCRIPTION OF THE DRAWING

FIG. 1 is an axial end view of an arrangement for performing facing and chamfering operations on pipes, taken in direction of an arrow I of FIG. 1;

FIG. 2 is a side elevational view of the arrangement of FIG. 1; and

DETAILED DESCRIPTION OF THE PREFERRED EMBODIMENT

Figure 3:
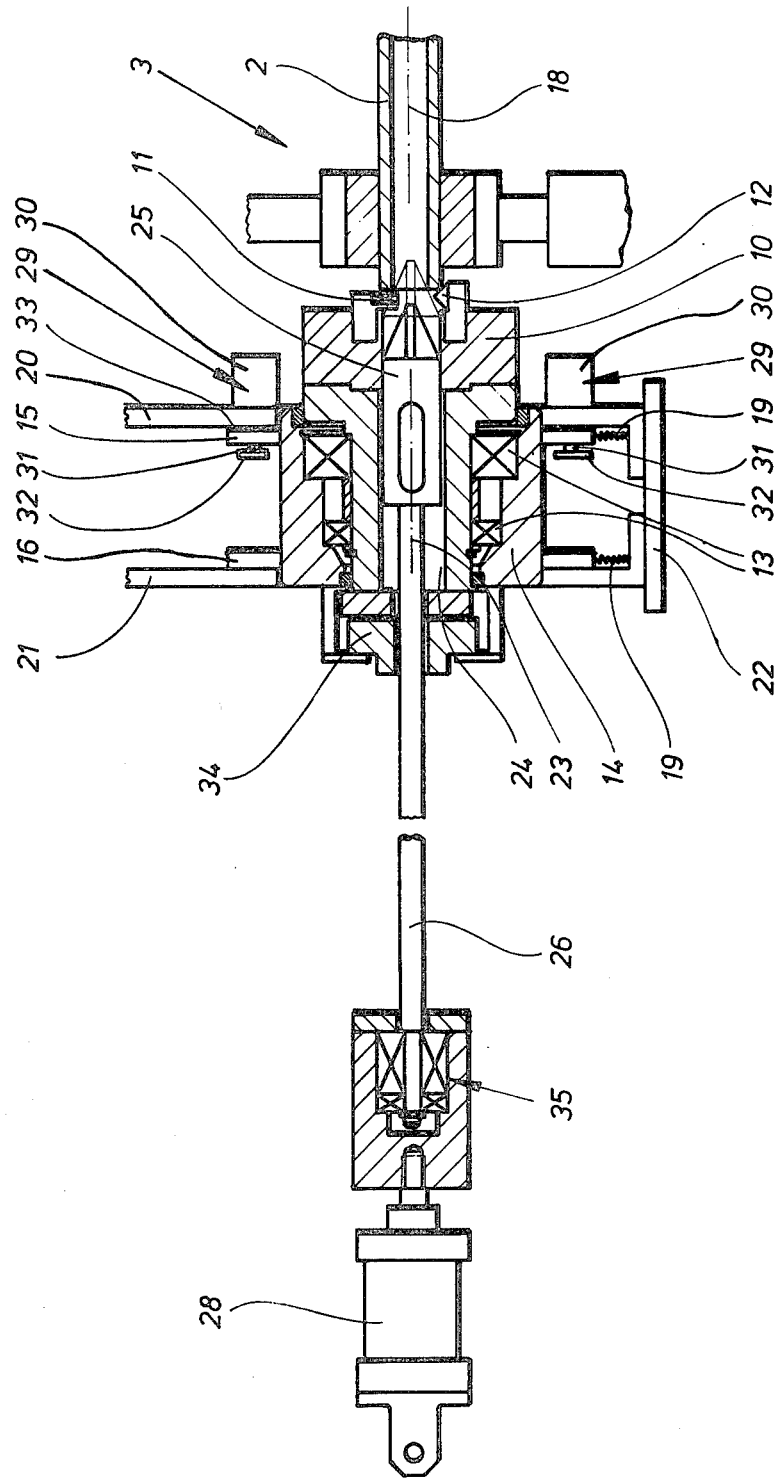
FIG. 3 is a partially sectioned side elevational view of certain components of the arrangement of FIGS. 1 and 2, on an enlarged scale.

Referring now to the drawing in detail, and first to FIGS. 1 and 2, it may be seen that the reference numeral 1 has been used therein to identify a machine frame or support of the arrangement according to the present invention. This arrangement is constructed as a facing and chamfering arrangement, which is capable of machining or removing material from the face and at least the outer edge portion of a pipe 2 or a similar tubular object. In order to hold the pipe 2 to be machined on the machine frame 1 in a predetermined position, there is provided a clamping device 3 constructed as a prismatic clamp having a lower component 4 supported on a recessed portion 5 of the machine frame 1 and an upper component 6 which is mounted on the machine frame or support 1 by means of rigid reinforced support beams 7 and 8 which maintain their angle under all circumstances. The lower and upper components 4 and 6 carry respective clamping prisms or jaws 9 which are movable in the vertical direction, preferably by hydraulic operating units.

As can best be seen from the comparison of FIGS. 1 and 3, there are provided, for the purpose of machining the end face of the respective pipe 2 and of providing chamfered surfaces at such an end face, corresponding facing and chamfering tools 11 and 12 which are mounted at that end of a tool holder 10 which extends toward the pipe 2. These tools 11 and 12 are movable in the conventional manner, especially in the radial direction. The tool holder 10 is mounted, by means of suitable roller bearings 13, on a housing or carrier 14 for rotation about its axis. The carrier 14 is provided, at its exterior, with a pair of guiding walls 15 and 16 which are axially spaced from one another. As may be seen especially in FIG. 1, the guiding walls 15 and 16 extend exactly normal to a longitudinal guide 17 provided on the machine frame 1. The longitudinal guide 17 extends exactly parallel to an axis 18 of the pipe 2 on which the inner surface of the pipe 2 is centered.

The guiding walls 15 and 16 are supported on the machine frame 1 by means of springs 19 and are dispaceable along a pair of confining walls 20 and 21 which are mounted on a carriage 22 for movement longitudinally of and on the longitudinal guide 17.

For centering a rotational axis 23 of the tool holder 10 relative to the pipe axis 18, there is provided a spindle 25 having a tapering and cross-sectionally cross-shaped head or end portion. The spindle 25 is received and guided in an internal passage 24 of the tool holder 10 for movement in the axial direction of the latter but without angular displacement about the axis 23 relative to the tool holder 10. The spindle 25 is connected to the free end of a connecting rod 26 of a limited flexibility. After the respective pipe 2 has been clamped in position in the prismatic clamping device 3, the spindle 25 is caused to penetrate into the open end of the internal bore of the pipe 2 (as shown in dash-dotted lines in FIG. 3) by the action of a cylinder-and-piston unit 28 which is accomodated in the interior of a drive housing 27 of the machine frame 1. Accordingly, the spindle 25 is caused to concentrically nest in the open end of the pipe 2, as a result of which the spring-supported carrier 14 which is guided between the confining walls 20, 21 by means of the guiding walls 15, 16, and with it the rotational axis 23 of the tool holder 10, become exactly centered on the axis 18 of the pipe 2.

Upon the conclusion of the centering operation, the guiding wall 15 is arrestingly clamped to the confining wall 20 in the thus obtained working position, by means of two cylinder-and-piston clamping units 29. The clamping cylinder-and-piston units 29 are situated diametrically opposite to one another with respect to the rotational axis 23. The units 29 have respective housings 30 which are affixed to the guiding wall 20. The units 29 further include piston rods 31 which penetrate through respective associated openings in the confining and guiding walls 20, 15. The piston rods 31 have at their free ends respective clamping heads 32 which are pulled toward the guiding plate 15 when pressurized medium is appropriately admitted into the interior of the respective clamping unit 29. As a result of this pulling action, the guiding wall 15 is pulled toward and into contact with the confining wall 20. A friction lining is interposed between the guiding wall 15 and the confining wall 20.

After the arresting of the carrier 14 of the tool holder assembly, the spindle 25 is retracted into the interior of the tool holder 10 by oppositely actuating the cylinder-and-piston unit 28. Thus, the spindle 25 is removed from the interior and from the immediate vicinity of the pipe 2.

The rear end of the tool holder 10, that is, that end which is remote from the pipe 2, is connected with a non-illustrated drive of conventional construction, by means of a coupling 34 which surrounds the connecting rod 26. When the spindle 25 is in its retracted position, the facing and chamfering machining of the pipe 2 can be performed. A rotary coupling 35 connects the connecting or push rod 26 with the cylinder-and-piston unit 28. Hence, as the spindle 25 rotates with the tool holder 10 during the machining operation, the coupling 35 prevents transmission of such rotation to the cylinder-and-piston unit 28.

For machining the end face and the chamfered surfaces, the entire arrangement consisting of the drive unit 27 and the tool holder carrier 14 is displaced longitudinally of the longitudinal guide 17.

It will be understood that each of the elements described above, or two or more together, may also find a useful application in other types of arrangements differing from the type described above.

While the invention has been illustrated and described as embodied in an arrangement for performing facing and chamfering operations at the end faces of pipes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

We claim:

1. In an arrangement for performing machining, especially facing and chamfering, operations at end faces of tubular objects, particulary pipes, of different diameters, a combination comprising a support; means for clampingly holding the respective tubular object on said support; a tool holder assembly including a carrier and a tool holder having a free end face mounted on said carrier for at least rotational movement about an axis and having a central passage centered on said axis; at least one tool mounted on the free end face of said tool holder; means for mounting said carrier on said support for relative displacement with said tool holder axis parallel to the object axis at least along a plane substantially normal to said axes; means for centering said tool holder relative to the object, including a spindle having a free end axially guided in said passage and having a tapering end portion on said spindle free end and extending toward the object, and means for moving said spindle in said passage between an extended position in which said tapering end portion is at least partly situated axially beyond the free end face of said tool holder thus interfering with access of said tool to the object, and partially extends into and engages the object, this engagement resulting in displacement of said assembly into a position of axial coincidence of said tool holder with the object, and a retracted position within said passage and axially inward from the free end face of said tool holder; means for arresting said carrier in said position of axial coincidence while said spindle is in said extended position thereof and maintaining said arresting when said spindle is in said retracted position; and means for effecting said at least rotational movement of said tool holder when said spindle is in said retracted position thereof.

2. The arrangement as defined in claim 1, wherein said moving means includes a cylinder-and-piston unit including a cylinder and a piston rod respectively connected to said support and to said spindle.

3. The arrangement as defined in claim 1; and further comprising spring means for at least mediately supporting said carrier on said support.

4. The arrangement as defined in claim 1, wherein said mounting means includes a pair of confining walls extending normal to the object axis at an axial distance from one another, and a pair of guiding walls rigid with said carrier and extending at least around said tool holder normal to said axis thereof, each of said guiding walls being juxtaposed with one of said confining walls at the side of the latter which faces toward the other confining wall; and wherein said arresting means includes means for clamping at least one of said guiding walls with the respectively juxtaposed confining wall.

5. The arrangement as defined in claim 4, wherein said clamping means includes at least two clamping cylinder-and-piston units extending substantially parallel to the object axis at respective locations which are diametrically spaced from one another with respect to the object axis.

6. The arrangement as defined in claim 4, wherein said arresting means further includes friction linings situated between the respective confining and guiding walls.

7. The arrangement as defined in claim 1, wherein said centering means includes means for guiding said spindle in said passage for only axial movement but not for rotation about said tool holder axis relative to said tool holder; and wherein said moving means includes a cylinder-and-piston unit pivotally mounted on said support and having a piston rod extending out of said unit, a connecting rod articulated to said spindle, and means for connecting said connecting rod to said piston rod for angular movement about the axis of said piston rod.

8. The arrangement as defined in claim 1, wherein said effecting means includes a drive, and a coupling interposed between said drive and said tool holder and permitting limited spatial movement of said tool holder relative to said drive.

9. The arrangement as defined in claim 1; wherein said effecting means and at least a portion of said moving means are mounted on said carrier for displacement therewith and with said tool holder along said plane.

* * * * *